(12) United States Patent
Carberry et al.

(10) Patent No.: US 10,114,190 B2
(45) Date of Patent: Oct. 30, 2018

(54) SYSTEM AND METHOD FOR MARKING OPTICAL COMPONENT AT HIGH SPEED

(71) Applicant: Corning Optical Communications LLC, Hickory, NC (US)

(72) Inventors: Joel Patrick Carberry, Big Flats, NY (US); Anping Liu, Horseheads, NY (US); Eric J. Mozdy, Horseheads, NY (US); Barada Kanta Nayak, Painted Post, NY (US)

(73) Assignee: Corning Optical Communications LLC, Hickory, NC (US)

( * ) Notice: Subject to any disclaimer, the term of this patent is extended or adjusted under 35 U.S.C. 154(b) by 0 days.

(21) Appl. No.: 15/224,914

(22) Filed: Aug. 1, 2016

(65) Prior Publication Data

US 2017/0045706 A1 Feb. 16, 2017

Related U.S. Application Data

(60) Provisional application No. 62/203,504, filed on Aug. 11, 2015.

(51) Int. Cl.
*G02B 6/44* (2006.01)
*G02B 26/12* (2006.01)
(Continued)

(52) U.S. Cl.
CPC ............ *G02B 6/4482* (2013.01); *B41F 17/08* (2013.01); *B41J 2/01* (2013.01); *B41J 3/4073* (2013.01); *B41M 5/24* (2013.01); *G02B 26/121* (2013.01); *G02B 26/127* (2013.01); *B41M 7/00* (2013.01); *G02B 6/4434* (2013.01);
(Continued)

(58) Field of Classification Search
None
See application file for complete search history.

(56) References Cited

U.S. PATENT DOCUMENTS 4,433,894 A 2/1984 Hanson et al.
4,509,819 A 4/1985 Sherman et al.
(Continued)

FOREIGN PATENT DOCUMENTS

WO 2006114594 A2 11/2006
WO 2013156664 A1 10/2013

OTHER PUBLICATIONS

International Searching Authority Invitation to Pay Additional Search Fees PCT/US2016/045295 dated Oct. 7, 2016.

*Primary Examiner* — John M Bedtelyon
(74) *Attorney, Agent, or Firm* — William D. Doyle

(57) ABSTRACT

A system and method for marking a moving surface of a fiber optic cable is provided. The system includes a supply of the fiber optic cable, a laser generating device configured to generate a laser beam that forms markings by interacting with the material of the moving surface of the fiber optic cable. The system includes a movement device moving the fiber optic cable through the system at a speed of at least 50 m per minute. The system includes a laser directing device located in the path of the laser beam and configured to change the path of the laser beam to direct the laser beam to a plurality of discrete locations on the moving surface to form a series of marks on the moving surface. The moving surface includes a plurality of tracking indicia to allow the position of the moving surface to be determined.

20 Claims, 6 Drawing Sheets

(51) Int. Cl.
  *B41F 17/08* (2006.01)
  *B41J 3/407* (2006.01)
  *B41J 2/01* (2006.01)
  *B41M 5/24* (2006.01)
  *B41M 7/00* (2006.01)
  *H01B 13/34* (2006.01)

(52) U.S. Cl.
  CPC .......... *G02B 26/122* (2013.01); *G02B 26/129* (2013.01); *H01B 13/348* (2013.01)

(56) References Cited

U.S. PATENT DOCUMENTS

| | | |
|---|---|---|
| 5,474,627 A | 12/1995 | Carriere et al. |
| 6,370,304 B1 | 4/2002 | Mills et al. |
| 8,865,379 B2 | 10/2014 | Sharpe et al. |
| 9,272,366 B2 * | 3/2016 | Reversat ............ B23K 26/0846 |

* cited by examiner

SYSTEM AND METHOD FOR MARKING OPTICAL COMPONENT AT HIGH SPEED

CROSS-REFERENCE TO RELATED APPLICATIONS

This application claims the benefit of priority to U.S. Provisional Application No. 62/203,504, filed on Aug. 11, 2015, and is incorporated herein by reference.

BACKGROUND

The disclosure relates generally to optical cable components including surface markings, and specifically to high speed marking systems and methods for fiber optic cable components. Optical communication cables have seen increased use in a wide variety of electronics and telecommunications fields. Optical communication cables may contain or surround one or more optical communication fibers. The cable provides structure and protection for the optical fibers within the cable.

SUMMARY

One embodiment of the disclosure relates to a system for marking a moving surface of a fiber optic cable. The system includes a supply of the fiber optic cable and a laser generating device configured to generate a laser beam that forms markings by interacting with the material of the moving surface of the fiber optic cable. The system includes a movement device moving the fiber optic cable through the system at a speed of at least 50 m per minute and a laser directing device located in the path of the laser beam. The laser directing device is configured to change the path of the laser beam to direct the laser beam to a plurality of discrete locations on the moving surface to form a series of marks on the moving surface.

An additional embodiment of the disclosure relates to a method for marking a moving surface of a fiber optic cable. The method includes providing a laser generating device configured to generate laser light, and moving a surface of a fiber optic cable component past the laser generating device at a speed of at least 50 m per minute. The method includes directing the laser light at a plurality of discrete locations on the moving surface. The method includes forming a series of marks on the moving surface through an interaction between the laser light and the surface.

An additional embodiment of the disclosure relates to an optical cable component including a body having an outer surface and an inner surface defining a lumen. The optical cable component includes one or more optical transmission elements located within the lumen and a plurality of tracking indicia spaced from one another along the length of the body. Each adjacent pair of tracking indicia define a label area on the outer surface of the body located between each adjacent pair of tracking indicia. The tracking indicia have a first marking structure formed from a first indicia formation method, and the tracking indicia are non-alpha numeric indicia. The optical cable component includes a plurality of label markings formed in each of the label areas. The label markings have a second marking structure formed from a second indicia formation method. The first marking structure is different than the second marking structure, and the first indicia formation method is different from the second indicia formation method.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding and are incorporated in and constitute a part of this specification. The drawings illustrate one or more embodiment(s), and together with the description serve to explain principles and operation of the various embodiments.

DETAILED DESCRIPTION

Figure 1:
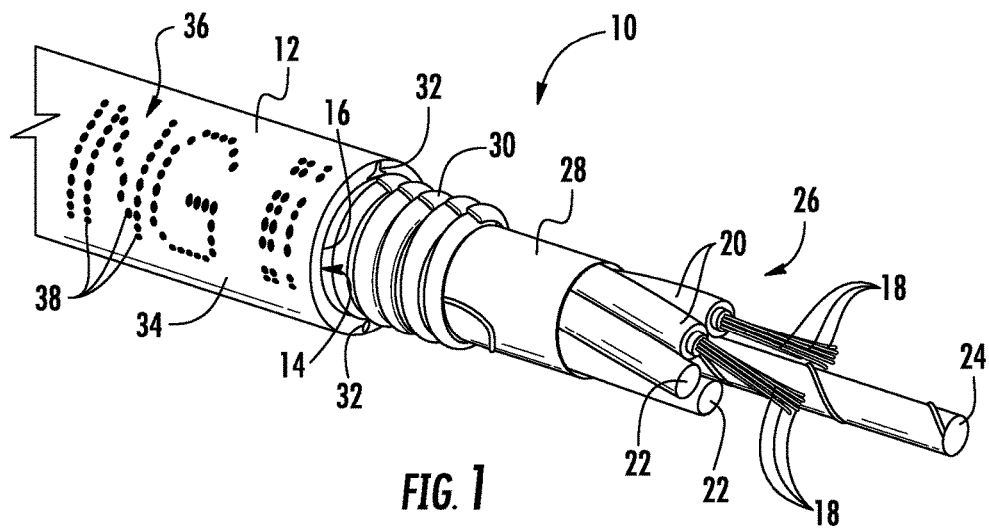
FIG. 1 is a perspective view of an optical fiber cable according to an exemplary embodiment.

Referring generally to the figures, systems and methods for forming markings (e.g., indicia, labels, etc.) on outer surfaces of optical cable components at high-speeds are shown and described. In particular, the systems and methods discussed here are configured to form markings on the outer surface of a cable component (e.g., outer surface of an outer cable jacket, of a buffer tube, of a tight buffered optical fiber, of an optical fiber micro-module, of an optical fiber subunit, of a fiber optic ribbon, etc.) at production speeds of greater than 50 meters/min, specifically greater than 100 meters/min, and more specifically greater than 200 meters/minute.

The system and method discussed herein achieves these high production rates by utilizing a laser marking system that is able to direct a marking laser beam on to distinct portions or sections of the moving cable component surface by changing laser direction at high speeds. To accomplish the high speed laser positioning, the system includes a laser directing device that is capable of changing laser direction at high rates of speed. In one particular embodiment, the system used herein utilizes a rotating mirror that includes reflective surfaces or facets along the peripheral surface of the mirror. The mirror rotates in one direction about an axle and reflects the laser onto the desired positions of the moving cable component surface. By rotating the mirror about the axis, the angular position of the reflective facet relative to the laser continuously changes, and the laser marking system synchronizes laser operation (e.g., by controlling power modulation, by controlling the laser with an external modulator) with the rotational position of the reflective facet so that the laser is incident on the facet when the facet is at the correct angular position to direct the laser onto the surface at the position where the desired marking is to be formed. In contrast to conventional laser marking systems that utilize a mirror that rotates in multiple directions in order to properly direct the laser, the system discussed herein avoids the speed deficiencies that result from the deceleration and direction reversals needed in such systems.

In another embodiment, the laser marking system discussed herein utilizes an optical deflector controlled by a controller. In such embodiments, the optical deflector may be either an acoustic optical deflector or an electro-optical deflect. In such embodiments, the optical deflector receives the laser beam from a laser generating device and directs the laser to the appropriate portion of the cable component at which the marking is to be formed. In this embodiment, because the optical deflector changes the laser path based on an acoustic or electronic signal without moving parts, the optical deflector is able to change the path of the laser at high enough speeds to accommodate the high throughput of the system discussed herein.

In some embodiments, the laser marking system may form indentations in the moving surface of the cable (e.g., the outer surface of the cable jacket) with the marking laser, and then overwrite or fill in the indentations with a high-contrast material, such as an ink material, in order to facilitate viewing/detection of the laser printed indicia. In various embodiments, the over-writing may be formed using an inkjet printing system. In specific embodiments, such laser marking systems may track the position of the laser markings relative to the inkjet printed markings, and adjust system operation to improve alignment between the two markings. In these embodiments, the laser marking system may utilize the two dimensional scanning or aiming ability of the marking laser disclosed herein to aim the laser based on the measured relative position between the inkjet printed markings and the laser markings to provide better alignment between the laser formed indentations and the ink marks.

The various embodiments of the laser marking systems and methods discussed herein are believed to be able to mark or print a surface of an optical cable at speeds faster than conventional hot foil printing techniques and conventional laser printing techniques. Further, in contrast to surface printing techniques, the laser formed markings discussed herein are not particularly susceptible to damage, abrasion or wear that is typically found with deposited ink based markings. In some embodiments, the recess of ink layers provided by the laser formed indentations may provide abrasion resistance to the ink layer.

In addition to the system and method embodiments discussed herein, the present application also relates to a cable component surface arrangement configured to facilitate marking using the high speed laser systems discussed herein. In various embodiments, the cable component surface to be marked includes a plurality of tracking indicia spaced from each other along the length of the cable component defining label areas between adjacent tracking indicia. These tracking indicia have a first marking structure (e.g., a deposited ink layer) and are formed from a first indicia formation method (e.g., inkjet printing), and are non-alpha numeric indicia. In such embodiments, the cable component also includes a plurality of label markings formed in each of the label areas, and the label markings have a second marking structure (e.g., a laser formed mark) formed from a second indicia formation method (e.g., high speed laser marking). In this arrangement, the first marking structure is different than the second marking structure and the first indicia formation method is different from the second indicia formation method. In particular, the tracking indicia are monitored during high speed laser marking (e.g., via a vision system) to determine cable speed and position, and this information is used to adjust or calibrate the laser marking system to ensure the laser markings are properly formed in the proper position.

Referring to FIG. 1, an optical communication cable, shown as cable 10, is shown according to an exemplary embodiment. Cable 10 includes a cable body, shown as cable jacket 12, having an inner surface 14 that defines an inner channel, passage or cavity, shown as central bore 16. As will be generally understood, inner surface 14 of jacket 12 defines an internal area or region within which the various cable components discussed below are located. A plurality of optical transmission elements, shown as optical fibers 18, are located within bore 16. Generally, cable 10 provides structure and protection to optical fibers 18 during and after installation (e.g., protection during handling, protection from elements, protection from vermin, etc.).

In the embodiment shown in FIG. 1, cable 10 includes a plurality of core elements located within central bore 16. A first type of core element is an optical transmission core element, and, in the embodiment of FIG. 1, the core elements include one or more optical fibers 18 that are located within tubes, such as buffer tubes 20. One or more additional core elements, shown as filler rods 22, may also be located within bore 16. In the embodiment shown, filler rods 22 and buffer tubes 20 are arranged or wrapped around a central support, shown as central strength member 24 formed from a material such as glass-reinforced plastic or metal (e.g., steel). Together, buffer tubes 20 containing optical fibers 18, filler rods 22 and central strength member 24 form the core 26 of cable 10. In various embodiments, core 26 may include any type of optical core element in any combination including optical micro-modules, fiber optic subunits, bundles of fiber optic subunits, tight buffered optical fibers, filler tubes, etc.

In various embodiments, such as shown in FIG. 1, cable 10 may include a variety of additional layers or structures located within jacket bore 16 between core 26 and inner surface 14. For example, a water blocking material, such as water barrier tape 28, may be located around the wrapped buffer tubes 20 and filler rods 22. Cable 10 may also include a reinforcement sheet or layer, shown as armor layer 30, that is located outside of water barrier 28. Armor layer 30 is wrapped around the interior elements (including optical fibers 18) of cable 10 such that armor layer 30 surrounds optical fibers 18 within bore 16. Armor layer 30 generally provides an additional layer of protection to fibers 18 within cable 10, and may provide resistance against damage (e.g., damage caused by contact or compression during installation, damage from the elements, damage from rodents, etc.). In various embodiments, armor layer 30 may be formed from a variety of strengthening or damage resistant materials. In various embodiments, cable jacket 12 may include one or more discontinuity, such as co-extruded discontinuities 32, embedded in cable jacket 12. In general, discontinuities 32 provide a weakened area in jacket 12 that allows the user to peel open jacket 12 in order to access core 26.

In various embodiments, cable jacket 12 is formed from an extruded thermoplastic material. In various embodiments, cable jacket 12 may be a variety of materials used in cable manufacturing such as polyethylene, medium density polyethylene, polyvinyl chloride (PVC), polyvinylidene difluoride (PVDF), nylon, polyester or polycarbonate and their copolymers. In addition, the material of cable jacket 12 may include small quantities of other materials or fillers that provide different properties to the material of cable jacket 12. For example, the material of cable jacket 12 may include materials that provide for coloring, UV/light blocking (e.g., carbon black), burn resistance, etc.

Cable jacket 12 includes an outer surface 34. Cable jacket 12 includes an area to receive label markings, shown as label area 36. Within label area 36, markings, shown as laser formed dots 38, are formed on outer surface 34. As explained in more detail below, dots 38, are laser formed marks formed using a high-speed laser marking system.

Figure 2:
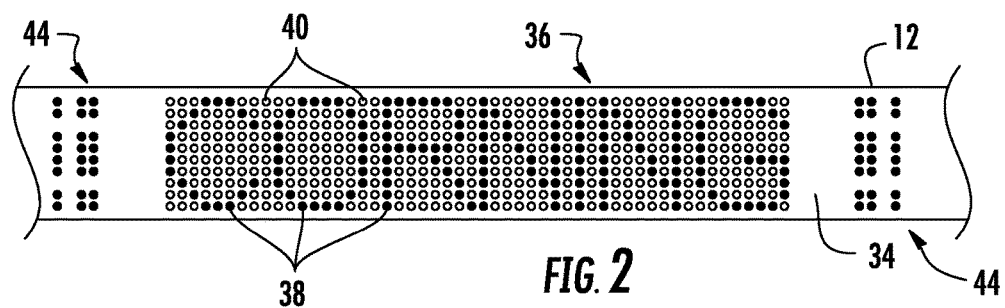
FIG. 2 is a detailed view of markings on an outer surface of the optical fiber cable of FIG. 1 according to an exemplary embodiment.

Referring to FIG. 2, a detailed view of label area 36 is shown. In the embodiment shown, dots 38 are formed in a marking pattern to form the desired label or indication (e.g., alphanumeric indicia, symbols, the trademark "Corning" as shown, etc.). By way of example, in FIG. 2, dots 38 are shown within a positional array, represented by the unmarked or unfilled dots 40, in FIG. 2. As explained in more detail below, dots 38 and 40 together represent the different discrete positions within label area 36 that a marking laser may be aimed at to form dots 38. In various embodiments, dots 38 may be laser created depressions, laser created bumps, colored marks formed by a material within jacket 12 based on the interaction with a marking laser, or any other laser formed marking indicia. It should be understood that while a single label area 36 is shown in FIG. 2, the marking arrangement shown in FIG. 2 may be repeated at intervals along the entire length of cable 10.

As shown in FIG. 2, cable 10 may include a plurality of tracking indicia, shown as tracking dot arrays 44, formed at spaced intervals from each along outer surface 34 of cable jacket 12. In this embodiment, each pair of tracking dot arrays 44 define the label area 36 in which dots 38 are formed. Tracking dot array 44 is shaped to provide two dimensional position information (e.g., position in both x and y directions) when detected by an appropriate vision system. In general, tracking dot arrays 44 are detected (e.g., by a vision system) during formation of dots 38, and the detected position of dot arrays 44 are used to properly aim the laser to form dots 38 at the correct position within label area 36. Tracking dot arrays 44 are formed such that the precision of the position detection is less than the size (i.e., diameter) of one dot 38, and preferably is less than one half the size (i.e., diameter) of one dot 38. For example, for a font height of 8 mm with a pixel size of <800 um, the precision of cable position detection provided by tracking dot array 44 should be better than 800 µm and more preferably better than 400 µm.

In various embodiments, dot arrays 44 have a first structure that is different from the structure of laser formed dots 38, and dot arrays 44 are also formed from a first forming or printing method that is different from the high speed laser printing used to create dots 38. In such embodiments, the method used to form dot arrays 44 is a method that does not utilize position tracking of cable jacket 12 to form dot arrays 44, and thus, may formed on a blank cable jacket prior to formation of dots 38. In a specific embodiment, tracking dot arrays 44 may be formed from ink droplets, deposited by an inkjet printing method. It is believed that inkjet printing may be suitable for formation of tracking dot arrays 44 because it allows for high-speed deposition, and the limited adhesion typical of inkjet printing on polymer cable jackets and the corresponding limited wear resistance in the field is not an issue because once dots 38 are formed, tracking dot arrays 44 are no longer needed.

Figure 3:
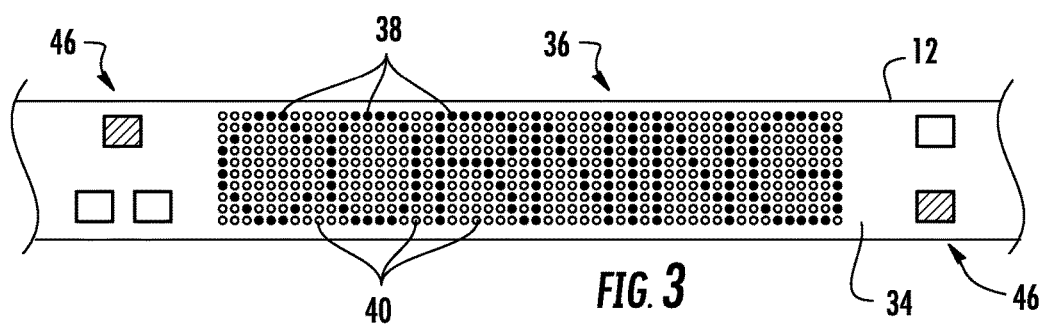
FIG. 3 is a detailed view of markings on an outer surface of the optical fiber cable of FIG. 1 according to another exemplary embodiment.

Referring to FIG. 3, cable jacket 12 is shown with a plurality of tracking indicia, shown as tracking marks 46, according to another exemplary embodiment. Tracking marks 46 function and are formed in a manner similar to tracking dot arrays 44, and also define label area 36 between pairs of tracking marks 46. In other embodiments, the tracking indicia may be any suitable arrangement of marks or markings that allow the tracking of label area 36 at high speeds and to provide two dimensional information of position and speed of the surface to be marked.

Figure 4:
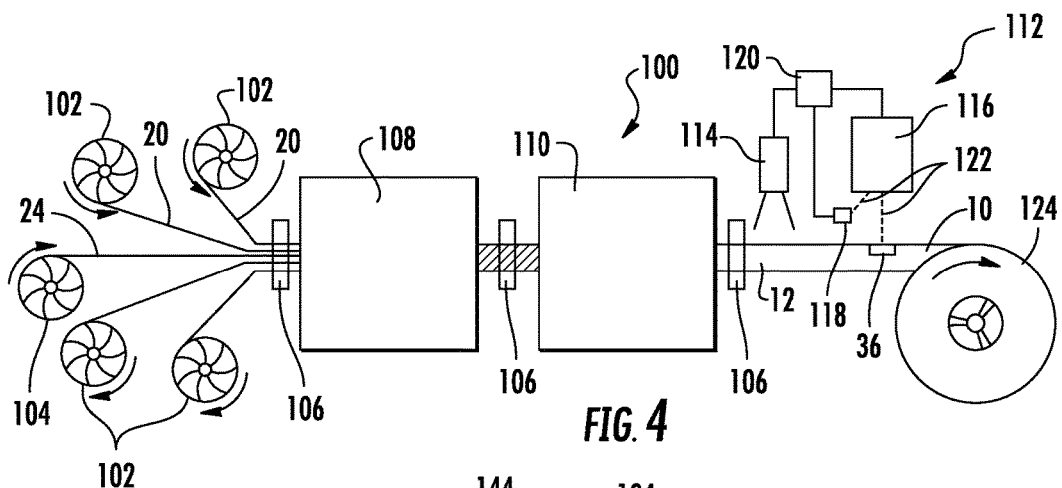
FIG. 4 is a schematic view showing a system and process for forming an optical cable including high-speed laser formed markings according to an exemplary embodiment.

Referring to FIG. 4, a schematic view of a process and system 100 for forming an optical cable having high speed laser printed markings, such as cable 10, is shown according to an exemplary embodiment. In one embodiment, after formation of buffer tubes 20 around fibers 18, buffer tubes 20 may be stored on reels 102. In addition, one or more filler tube 22 may be stored on a reel 102, and a central strength member 24 may be stored on reel 104.

To produce a cable, such as cable 10, buffer tubes 20 are unwound from reels 102. In various embodiments, system 100 may include one or more movement device 106 configured to move cable components and/or jacketed cable 10 through system 100 at high rates of speed. In various embodiments, movement devices 106 are configured to move cable components and jacketed cable 10 at a speed of at least 50 meters per minute, specifically at least 100 meters per minute, and more specifically at least 200 meters per minute. Movement devices 106 may include any suitable device or equipment suitable for moving cables and cable components within a manufacturing environment, including pullers, winders, conveyors, etc.

In various embodiments, as components are unwound from spools 102 and 104, the components may be moved into stranding station 108. In general, stranding station 108 couples buffer tubes 20 together along with any filler tubes 22 and central strength element 24. In one embodiment, buffer tubes 20 and filler tubes 22 are coupled around strength element 24 in a pattern, such as a helical pattern or in a reversing helical pattern, such as an SZ stranding pattern. Following coupling together, the components of cable 10 are passed into one or more additional stations 110 to add any additional interior components, such as water blocker 28, armor 30, etc., and to then apply jacket 12 around the interior components. In a particular embodiment, additional station 110 includes a jacket extruder that extrudes a polymeric jacket 12 around the cable components. It should be understood that stations 108 and 110 are examples of a cable formation system, and that the high speed laser marking system discussed here may be used in conjunction with any optical cable formation system and any style of optical cable or during the formation of any optical cable component.

Following jacket extrusion, cable 10 moves into high speed marking system 112. In general, marking system 112 is configured to precisely control a variety of laser parameters, including laser power, pulse repetition rate, pulse duration and laser beam scanning in order to precisely form laser markings, such as dots 38, at the high throughput speeds of system 100. In addition, laser beam positioning or aiming by marking system 112 is precisely controlled using input data from one or more positional sensors that provide information related to the target area on cable jacket 12 (e.g., label area 36) and information related to the actual position of the generated laser beam.

As shown in FIG. 4, marking system 112 includes a vision system 114, a laser marking device 116, a laser position sensor 118 and a controller 120. In general, vision system 114 detects tracking indicia, such as tracking dot array 44 and tracking markings 46, to generate a signal indicative of the position and/or speed of label area 36 based on the detection of the tracking indicia. The signal from vision system 114 is communicated to controller 120, and controller 120 sends a control signal to laser marking device 116 in order to generate the desired markings (e.g., laser formed dots 38 shown in FIG. 2) based on the signal from vision system 114. In one embodiment, controller 120 sends a signal to laser marking device 116 causing laser marking device to begin forming markings in response to the detection of a leading tracking indicia, and to send a signal to marking device 116 to stop marking formation in response to detection of a trailing tracking indicia. In various embodiments, to form the desired laser markings at the high throughput speeds discussed herein, laser marking device 116 is configured to aim, reflect or otherwise change the direction of a generated laser at high speeds, and in various embodiments, this control may be based on the positional information from vision system 114. In various embodiments, as discussed in more detail below, laser marking device 116 is configured to change the path of the generated laser at least 2000 times per second. Further, it should be understood that marking system 112 may be used to mark any moving surface of a fiber optic formation system, including but not limited to, outer surfaces of buffer tubes 20, outer surfaces of tight buffered optical fibers, outer surfaces of optical fiber micro-modules, outer surfaces of optical fiber subunits, outer surfaces of fiber optic ribbons, etc.

In addition, as explained in more detail below, laser marking system 112 includes a laser position sensor or position sensitive detector 118 ("PSD 118") that is configured to detect the position of laser light, shown as laser beam 122, generated by laser marking device 116. In some embodiments, laser position sensor 118 may be located within the path of laser beam 122 as it travels onto outer surface 34 of cable jacket 12. In another embodiment, laser position sensor 118 may be located elsewhere, and laser marking system 112 is configured to periodically direct, reflect or aim laser beam 122 onto laser position sensor 118. In various embodiments, laser position sensor 118 generates a signal indicative of laser positioning and communicates this signal to controller 120. In various embodiments, controller 120 generates a control signal to laser marking system 116 based on the laser positioning information to control operation of laser marking system 116 to ensure that the laser formed indicia (e.g., dots 38) are being formed at the appropriate location on outer surface 34. Following formation of the laser markings, cable 10 may then be stored on a reel 124

Figure 5:
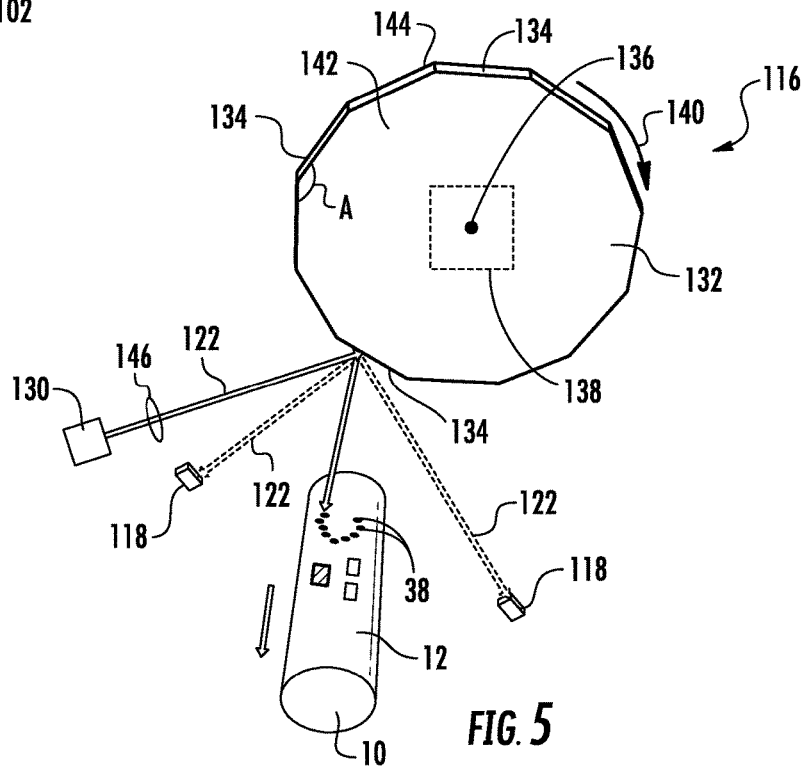
FIG. 5 is a schematic view of a high-speed laser marking system according to an exemplary embodiment.

Referring to FIG. 5, laser marking device 116 is shown in more detail according to an exemplary embodiment. Laser marking device 116 includes a laser generating device, shown as laser device 130, that is configured to generate laser beam 122 of an intensity and/or wavelength that allows for the formation of dots 38 on cable jacket 12. In various embodiments, laser device 130 is a laser operating at a highly absorbable wavelength for material of cable jacket 12. In various exemplary embodiments, laser device 130 is a $CO_2$ laser operating at wavelengths ranging from 9 μm to 11 μm, and in other embodiments, may be other types of lasers with wavelengths range from 200 nm to 8000 nm. In a specific embodiment, laser device 130 includes a laser head having dimensions of approximately 0.5 m×0.5 m×1 m, allowing laser marking device 116 to have a foot print on the order of 0.8 m×0.8 m.

Laser marking device 116 includes a laser directing device, shown as mirror 132. In general mirror 132 includes a plurality of reflective surfaces or facets 134. In the embodiment shown, each reflective facet 134 is a substantially planar facet that is located at an angle A, relative to the adjacent facets. In the embodiment shown angle A is greater than 90 degrees and less than 180 degrees, and is proportional to the number of facets 134. Mirror 132 is rotatably coupled to an axle 136 and a motor 138. Motor 138 is configured to spin mirror 132 continuously in one direction represented by arrow 140, and in this arrangement, as mirror 132 spins, facets 134 travel in a path in the direction of arrow 140 that circumscribes axle 136. As mirror 132 rotates around axle 136, the angle of reflection of laser beam 122 off of reflective facet 134 changes, and this changing angle of reflection in turn directs laser beam 122 onto different, discrete locations on outer surface 34, as cable jacket 12 moves through the laser marking station. In addition to allow laser beam 122 to periodically interact with laser position sensors 118, laser beam 122 is also directed toward position sensors 118 at various rotational positions of mirror 132. In general, because mirror 132 spins in a single direction and thus eliminates the deceleration and direction reversals used in some galvanometer-based laser marking systems, laser marking device 116 is able to operate at a much faster marking rate than typical laser marking systems.

In the specific embodiment shown, mirror 132 is a polygonal shaped mirror having a first major surface 142, and a second major surface opposing first major surface 142. In this embodiment, reflective facets 134 are formed along a peripheral edge surface 144 that extends between the opposing major surfaces. In this embodiment, peripheral edge surface 144 and reflective facets are substantially perpendicular to the first and second major surfaces, and axle 136 and the respective axis of rotation is substantially perpendicular to the first and second major surfaces.

Figure 10:
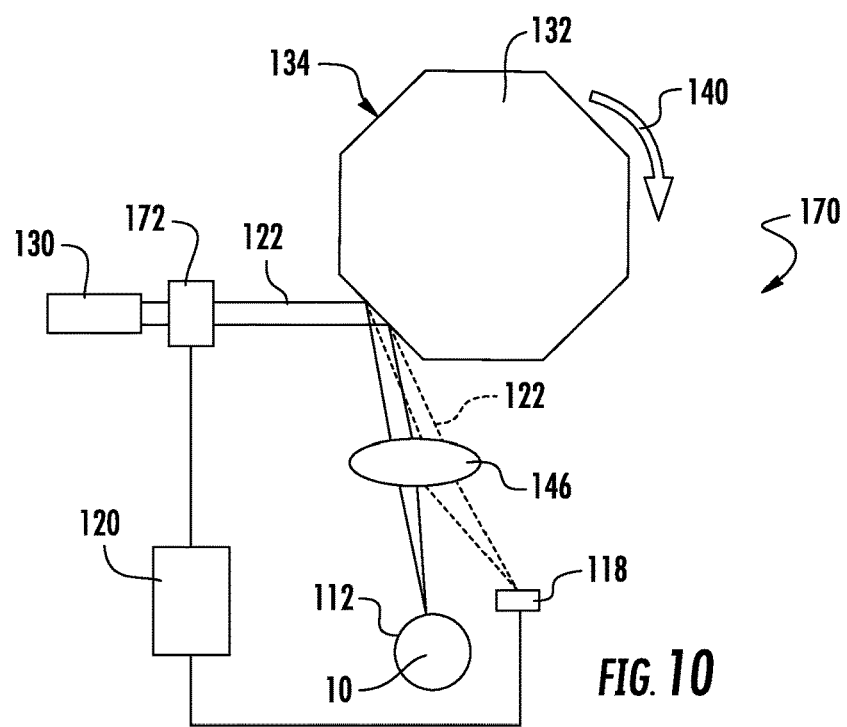
FIG. 10 is a schematic view of a high-speed laser marking system according to another exemplary embodiment.

Laser marking device 116 may also include one or more optical lens 146 located along the path of laser beam 122 between laser device 130 and cable jacket 12. In general, optical lens 146 focuses laser beam 122 so that its power intensity is well suited for making dots 38 of a relatively small size on cable jacket 12. In various embodiments, optical lens 146 can be either located between mirror 132 and laser device 130 (as shown in FIG. 5) or after between mirror 132 and cable jacket 12 (as shown in FIG. 10). In general the positioning of optical lens 146 is determined based on various factors including the physical arrangement of system 100, the desired pixel size, power intensity of laser device 130, processing throughput speed, etc. It should be understood that laser marking device 116 may include various components or arrangements to mitigate the contamination of optical components, such as the use of a vacuum nozzle, positioning the optical lens in a distant location from cable 10 and/or providing the optical lenses with various optical coating to reduce potential damage.

As noted above, in order to form dots 38 at high rates of speed, laser beam 122 must be directed to distinct positions on the outer surface of cable jacket 12 at high rates of speed. In the embodiment shown in FIG. 5, the speed at which laser beam 122 is directed to distinct points is based at least on the size and position of reflective facets 134 and the rotational speed of mirror 132. In various embodiments, rotational motor 138 is configured to spin mirror 132 at a rotational speed equal to or greater than 2000 rpm, and specifically at a rotational speed equal to or greater than 4000 rpm, and in specific embodiments, at a rotational speed between 2000 rpm and 50,000 rpm. In particular embodiments, marking system 112 discussed herein may be used to form symbols or characters within a size range of 2 mm to 8 mm having pixel size ranges from 0.2 mm to 0.8 mm. Referring to Table 1 below, various configurations for laser marking device 116 are shown according to exemplary embodiments.

TABLE 1

| Cable Speed (m/s) | Character height (mm) | Pixel Size (mm) | Mirror speed (rpm) | Number of reflective facets | Distance between mirror and moving outer surface (mm) | Laser repetition rate (kHz) |
|---|---|---|---|---|---|---|
| 1 | 4 | 0.4 | 10000 | 15 | 50 | 183 |
| 2 | 4 | 0.4 | 10000 | 32 | 25 | 91.6 |
| 3 | 8 | 0.8 | 14000 | 16 | 75 | 192 |
| 4 | 8 | 0.8 | 20000 | 16 | 75 | 275 |
| 4 | 2 | 0.2 | 40000 | 32 | 50 | 1470 |
| 0.8 | 2 | 0.2 | 4000 | 64 | 200 | 586 |

Figure 6:
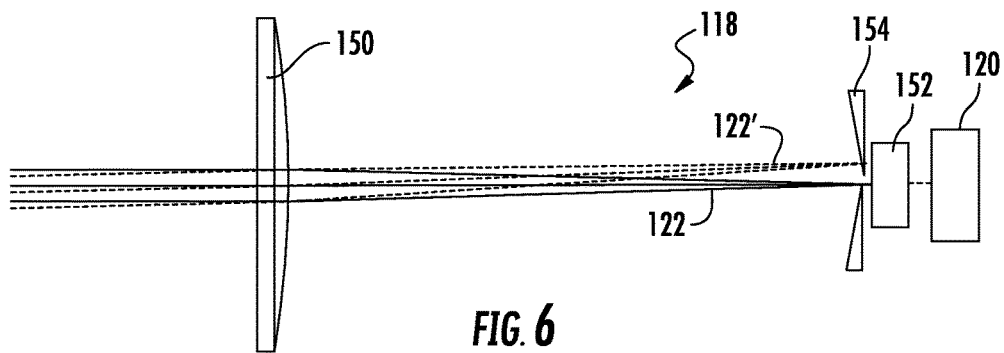
FIG. 6 is a schematic view of a laser beam position sensor according to an exemplary embodiment.

Referring to FIG. 6, laser beam position sensor 118 is shown according to an exemplary embodiment. As noted above, laser beam position sensor 118 monitors the position of laser beam 122 and provides feedback to controller 120, and controller 120 then controls the laser marking device 116 to ensure laser formed dots 38 are created at the proper location to form the desired indicia, symbol or characters. As will be understood the needed positional precision of laser beam 122 depends on the pixel size and resolution of the markings to be created by laser 130. In exemplary embodiments, the positional tolerance of laser beam 122 is a quarter of pixel size or better.

As shown in FIG. 6, laser position sensing device (PSD) 118 is located in the path of laser beam 122 scanning so that the laser beam may be detected by PSD 118. In various embodiments, the distance between PSD 118 and cable 10 is maintained constant, and laser marking system 116 is configured to maintain the variation or drift of the laser beam to less than a quarter or pixel size. In the exemplary embodiment of FIG. 6, laser beam 122 is focused by a lens 150 into a spot smaller than the size of detector 152. An aperture 154 with a diameter of smaller than detector 152 but slightly larger than the diameter of laser beam 122 is located in front of detector 152. Use of aperture 154 may increase positional precision of PSD 118. As a result of the arrangement shown in FIG. 6, only a very narrow angle of the laser beam 122 can be detected by detector 152. The smaller the aperture 154, the higher the positional resolution PSD 118 can achieve.

As shown in FIG. 6, if PSD 118 detects that laser beam 122 has shifted or drifted to the position shown as 122', detector 152 identifies that laser beam 122 has shifted. This positional information is communicated to controller 120, and controller 120 controls operation of laser marking device 116 to reposition laser beam 122 as needed. In various embodiments, controller 120 may control the power modulation (e.g., the on and off timing of laser device 130) to resynchronize the generation of laser beam 122 with the rotating mirror 132 and/or the rotational speed of mirror 132 may be adjusted to resynchronize the rotational position of mirror 132 with the generation of laser beam 122.

Marking system 112 may include various additional sensors as needed to provide precise positioning of laser beam 122 onto cable jacket 12. For example, in various embodiments, instead of or in addition to PSD 118, marking system 112 may include a rotary encoder, also called a shaft encoder, attached to mirror 132, axle 136 or motor 138 to monitor the location of reflective facets 134. In such embodiments, the encoder is an electro-mechanical device that converts the angular position or motion of a shaft or axle, e.g., axle 136, to an analog or digital signal. In one embodiment, the rotary encoder is an absolute type of encoder that provides absolute position of the shaft, which provides the angular information to controller 120. In such embodiments, these sensors may be angle transducers. In embodiments that use both a PSD and a rotary encoder, signals from both the encoder and PSD 118 are communicated to controller 120 to be used to synchronize laser operation and rotation of mirror 132.

Figure 7A:
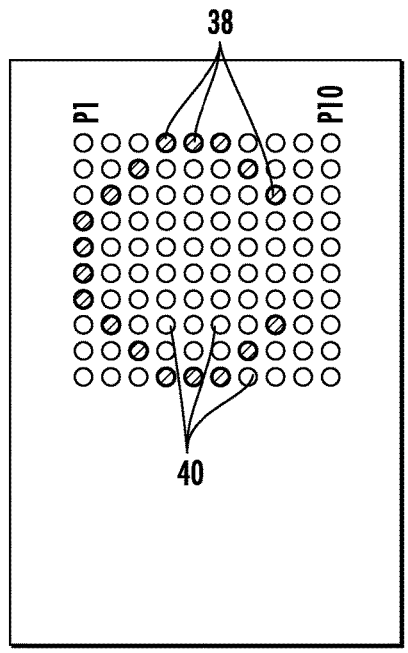
FIG. 7A illustrates a pixel matrix forming the letter "C" that may be formed with the high-speed laser marking system of FIG. 5 according to an exemplary embodiment.
Figure 7B:
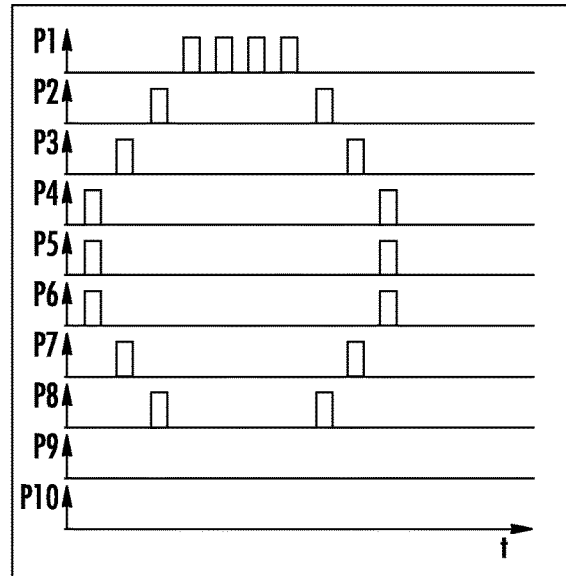
FIG. 7B illustrates the laser power variation at different pixel positions and at different times to form the letter "C" of FIG. 7A with the high-speed laser marking system of FIG. 5 according to an exemplary embodiment.

Referring to FIGS. 7A and 7B, an illustration of formation of the letter "C" is shown according to an exemplary embodiment. In this embodiment, the letter "C" is constructed by a 10×10 matrix with a total of 100 spots (pixels). The shaded pixels 38 are generated by the interaction between laser beam 122 and the outer surface of cable 10, and the unshaded pixels 40 represent areas having no change. In various embodiments, whether a shaded pixel 38 or a blank pixel 40 is formed at a particular location is determined by whether laser device 130 is turned on at a point in time when reflective facet 134 will direct the laser beam to a particular pixel. This on/off cycling of laser device 130 relative to the different pixel positions is shown in FIG. 7B. As shown in FIG. 7B, the laser is pulsed on and off in short intervals, and then the laser reflects off of reflective facets 134 toward the appropriate pixel positions to form the appropriate dots 38 in the appropriate patter to form the desired letter. In one embodiment, laser device 130 is on at least 70% of the time. In another embodiment, rather than turning laser device 130 completely on and off, the laser power or wavelength may be adjusted below a threshold required to form visible pixels 38 when laser beam 122 is being directed toward a position on the cable jacket 12 that should remain unmarked.

As will be understood, the pixel size and shape of shaded pixels 38 are determined by the laser beam shape, power, as well as wavelength and the cable material. In various embodiments, pixels 38 can be an indented spot, a bump with a convex shape, a discoloration or color change, a surface structure change, etc. In various embodiments, the particular type of pixel 38 will be based on the particular type of interaction between the laser and material of cable jacket 12. In various embodiments, the size of pixels 38 is between 2 microns and 1 mm, and the total number of pixels per square mm ranges from 50 to 10,000 depending on resolution requirements.

Figure 8A:
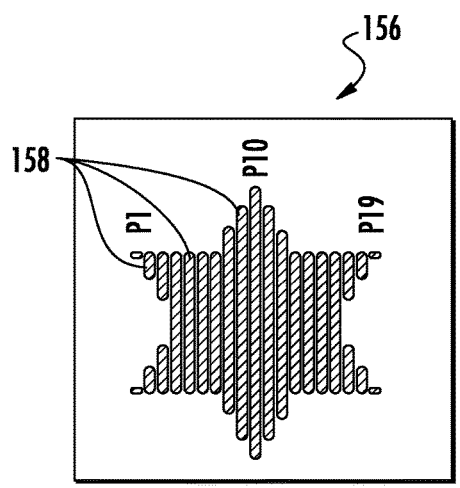
FIG. 8A illustrates a marking pattern forming a star pattern that may be formed with the high-speed laser marking system of FIG. 5 according to an exemplary embodiment.
Figure 8B:
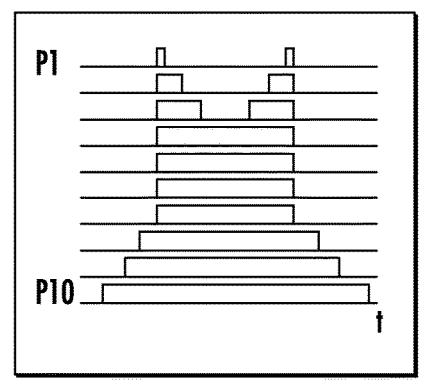
FIG. 8B illustrates the laser power variation at different cable surface positions and times to form the star pattern of FIG. 8A with the high-speed laser marking system of FIG. 5 according to an exemplary embodiment.

Referring to FIGS. 8A and 8B, a marking, shown as laser formed symbol 156, formed in label area 36 is shown according to an exemplary embodiment. Laser formed symbol 156 is substantially the same as the characters formed from dots 38, discussed above, except that laser formed symbol 156 is generated from a series of laser formed stripes or bands 158. Laser formed stripes 158 are formed by laser pulses that are longer than those used to create dots 38. FIG. 8B shows an exemplary laser pulse waveform that is used to form symbol 156.

Figure 9A:
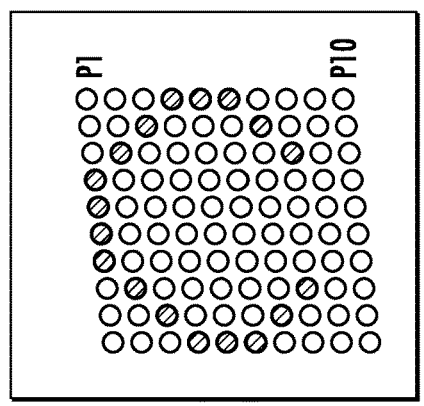
FIG. 9A illustrates a pixel matrix forming the letter "C" without cable speed correction according to an exemplary embodiment.
Figure 9B:
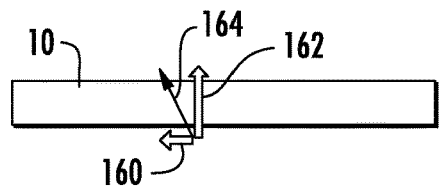
FIGS. 9B and 9C illustrate operation of a laser marking system having cable speed correction according to an exemplary embodiment.
Figure 9C:
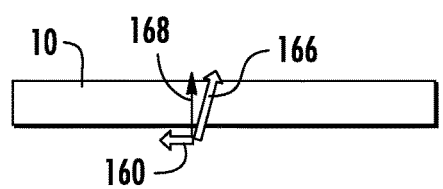

Referring to FIGS. 9A-9C, because cable jacket 12 is moving through marking system 112 at a high rate of speed, marking system 112 is configured to direct laser beam 122 in a manner that accounts for the speed of cable jacket 12. As shown in FIG. 9A and 9B, because cable 10 is moving in a direction indicated by arrow 160, if the laser marking velocity 162 is perpendicular to the movement of cable 10, the actual (or net) marking velocity 164 is at an angle relative to cable 10, and the characters formed will be distorted as shown in FIG. 9A. Thus, in one embodiment in order to form characters at the desired position, as shown in FIG. 7A, the scanning plane of the laser beam is tilted, represented by arrow 166 shown in FIG. 9C, so that the actual (or net) marking velocity 168 is perpendicular to cable 10.

Referring to FIG. 10, a laser marking device 170 is shown according to an exemplary embodiment. Laser marking device 170 is substantially the same as laser marking device 116, except as discussed herein. As shown in FIG. 10, laser marking device 170 includes lens 146 positioned between mirror 132 and cable 10. In this embodiment, lens 146 may function both to focus laser beam 122 onto cable jacket 12, and as lens 150 as part of PSD 118.

Laser marking device 170 also includes a modulator 172. In this embodiment, laser device 130 is operated to continuously generate laser beam 122, and modulator 172 operates as an optical switch to alternately allow and block laser beam 122 from passing through modulator 172. Thus, by controlling laser passage through modulator 172 the laser pulse patterns shown in FIGS. 7B and 8B can be generated without turning laser device 130 on and off directly. In various embodiments, modulator 172 may increase marking speed because modulator 172 can be cycled between pass and block modes faster than laser device 130 can be powered on and off. In various embodiments, because of the faster speed, higher resolution marking patterns may be generated as compared to other marking systems. In various embodiments, modulator 172 may be an electro-optical modulator or an acoustic optical modulator, and the operating frequency of such devices generally fall within a range of 2 kHz to 100 MHz.

As shown in FIG. 10, modulator 172 may be controlled by controller 120. In such embodiments, the signal from PSD 118 may be used by controller 120 to control the operation of modulator 172 in order to adjust for positional drift of the laser detected by PSD 118. In addition, positional information from vision system 114 may be used by controller 120 to control pass and block cycling of modulator 172 to synchronize laser pulses with the rotation of mirror 132.

In various embodiments, modulator 172 may be controlled by controller 120 to adjust print speeds during the initial stage of production (e.g., "line ramp-up") as the speed of cable 10 through the cable formation system increases at the beginning of production, and modulator 172 may be controlled by controller 120 to adjust print speeds during the final stage of production (e.g., "line ramp-down") as the speed of cable 10 through the cable formation system decreases at the end of production. In one embodiment, the number of positions or print columns (e.g., positions p1-p10 shown in FIG. 7A) produced by laser 130 per unit time can be increased or decreased to adjust for increasing or decreasing cable speed, respectively. In such embodiments, control of modulator 172 to adjust for changes in cable speed allows the rotational speed of mirror 132 to remain constant.

In various embodiments, modulator 172 can open or close in various patterns to accommodate various cable speeds or line speeds. For example, when line-speed is slower, modulator 172 can be controlled by controller 120 to alternately block/unblock laser beam 122 for each column or position, such that only odd or even columns are printed. In various embodiments, modulator 172 can be opened or closed, as controlled by controller 120, in various patterns to accommodate various line speeds. For example, modulator 172 can be controlled to by controller 120 to print one column and block for three, print one column, and block for three, etc. to account for a slowing cable speed.

Depending on the modulation format/pattern and laser type, the duty cycle of laser device 130 and stored power may be adjusted to ensure that the laser formed pixels are consistent (e.g., same size, shape, depth, etc.) regardless of modulation format. In various embodiments, the effective spot size on the cable generated by laser device 130 may be controlled. For example, faster cable speeds may result in more "blurring" of the spot (effectively creating a longer spot) because at faster cable speeds, laser beam 122 of a particular pulse duration will interact with a larger area of the cable surface than at slower speeds. Because smaller pixel size can be used to minimize this line speed blurring effect, controller 120 may be used to control the size of laser beam 122 to form smaller pixels at higher line speeds. In various embodiments, laser power and/or shutter exposure time may also be controlled by controller 120 to account for line speed and to control pixel blurring, based on the desired character accuracy.

Figure 11:
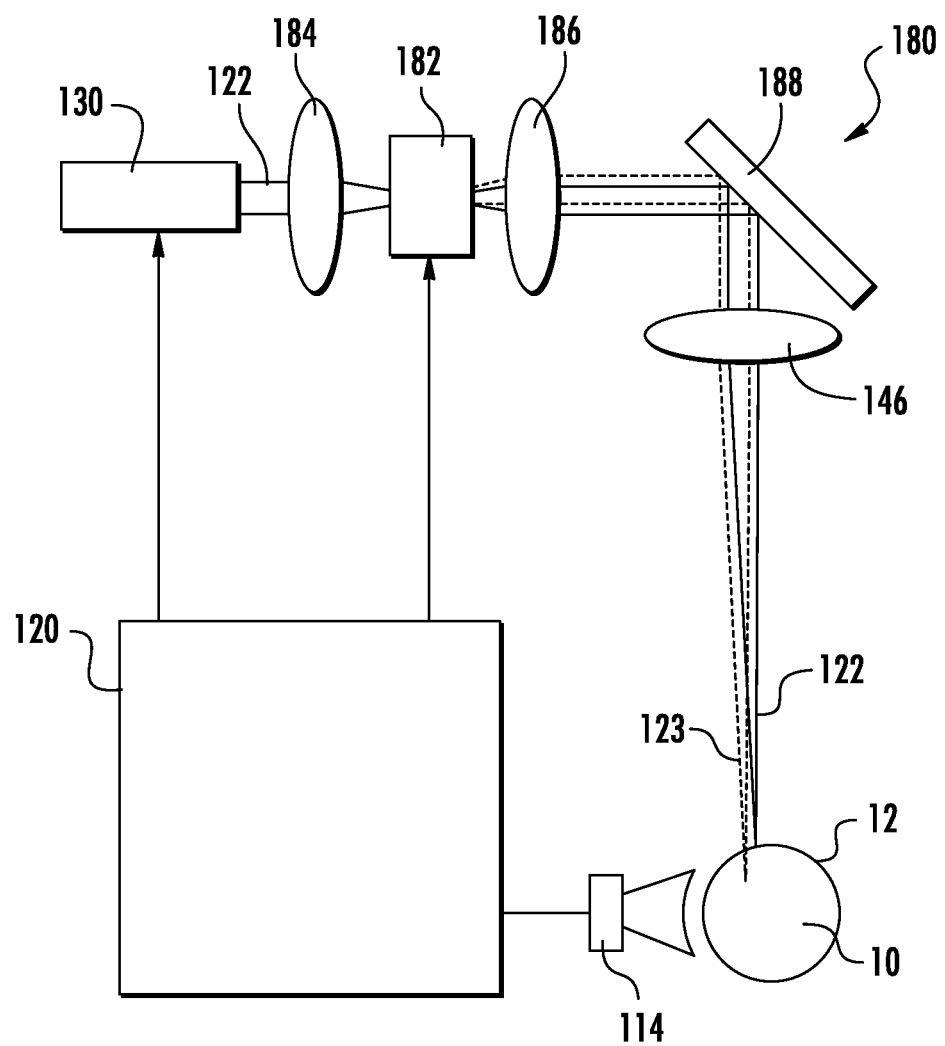
FIG. 11 is a schematic view of a high-speed laser marking system according to another exemplary embodiment.

Referring to FIG. 11, a laser marking device 180 is shown according to an exemplary embodiment. Laser marking device 180 is substantially the same as laser marking device 116, except as discussed herein. Laser marking device 180 includes a laser directing device, shown as an optical deflector 182. In general, optical deflector 182 is a device that can steer laser beam 122 to different positions (shown for example at 123) to form markings, such as laser formed dots 38 or stripes 158, on cable jacket 12. In various embodiments, deflector 182 can be either an acoustic or electric based device, in which the angular shift of laser beam 122 is proportional to the electric signal. Because of the nature of deflector 182 and response time to the control signal, it is believed that use of deflector 182 may allow for even higher marking speeds and resolutions.

In general, to generate the desired pattern, the laser power, scan angle, and cable location/speed information is synchronized by controller 120, and the timing of operation of deflector 182 is controlled by controller 120 based on this information. Similar to the embodiments discussed above, cable position information may be provided to controller 120 from vision system 114 that detects the location tracking indicia as discussed above, and laser beam position information may be provided to controller 120 from PSD 118. Thus, in such embodiments, the angle at which laser beam 122 is directed is based upon data regarding cable position and speed from vision system 114 and on laser beam position information from PSD 118. In addition, the laser beam scan plane controlled by deflector 182 is controlled to mitigate the speed distortion as discussed above regarding FIGS. 9A-9C.

In addition, as shown in FIG. 11, laser marking system 180 may include two lenses 184 and 186, one located between laser device 130 and deflector 182 and one located after deflector 182. In various embodiments, the focusing of laser beam 122 provided by lenses 184 and 186 can increase the laser modulation frequency at which deflector 182 changes the angle of laser beam 122 because deflector response time is proportional to the size of laser beam 122. By reducing the size of laser beam 122 inside the deflector 182, both rise and fall time can be shortened. Thus, for these reasons, the focusing of beam 122 provided by lenses 184 and 186 increases the rate at which laser beam 122 can be directed toward discrete positions on the outer surface of cable jacket 12. Laser marking system 180 also includes a mirror 188 that directs laser beam 122 at a right angle toward cable 10. Use of mirror 188 to redirect laser beam 122 allows the foot print of laser marking system 180 to be smaller than if laser beam 122 followed a generally linear path from laser device 130 to cable 10.

Figure 12B:
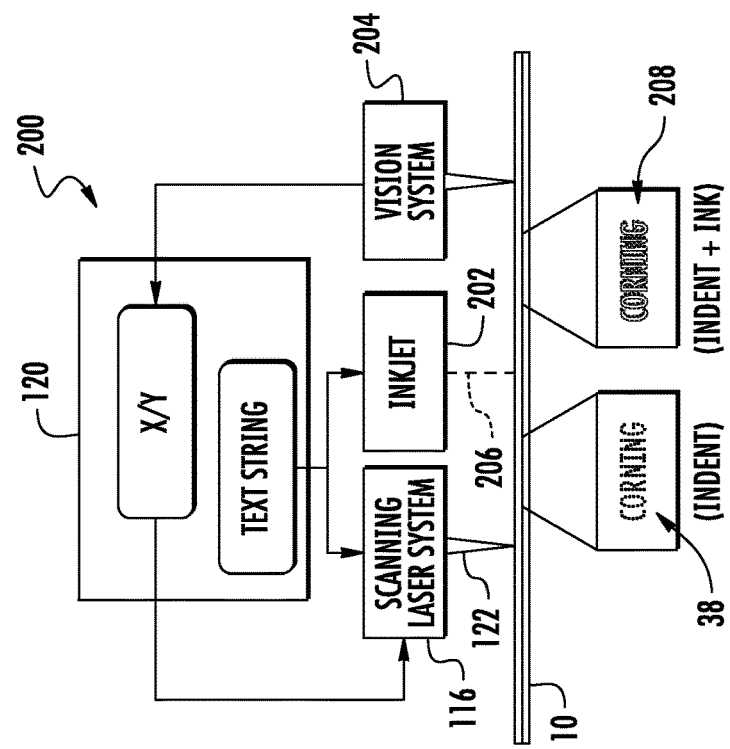
FIGS. 12A and 12B are schematic views illustrating operation of a high-speed laser marking system that includes ink-based overwriting according to an exemplary embodiment.
Figure 12A:
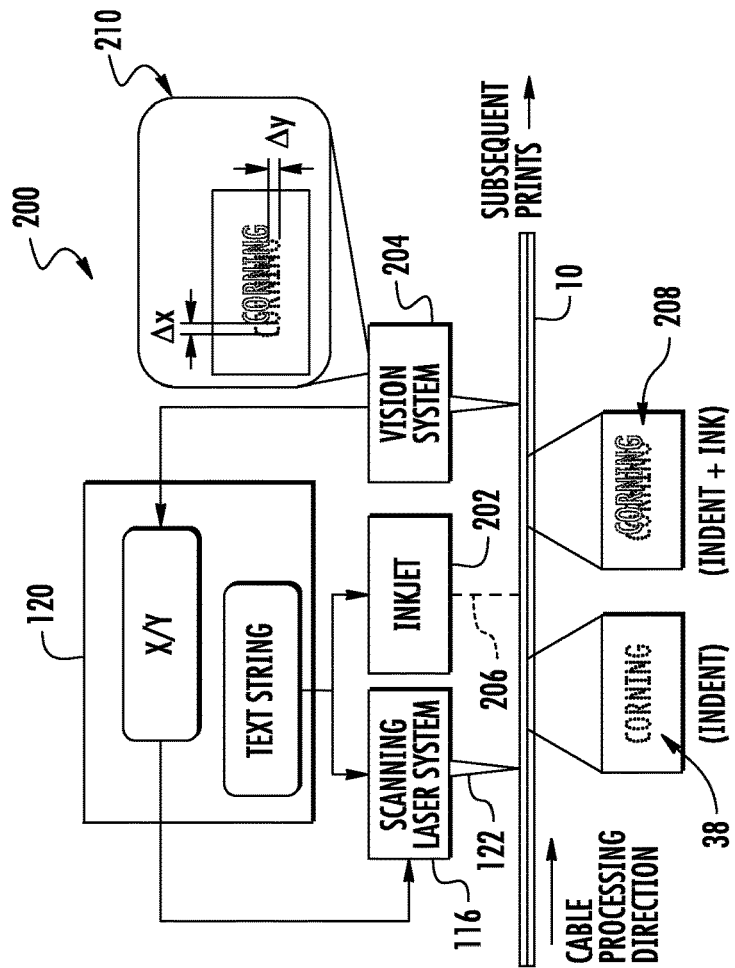

Referring to FIGS. 12A and 12B, a high speed laser marking system 200 is shown according to an exemplary embodiment. High speed laser marking system 200 is substantially the same as system 112 except as discussed herein. System 200 includes laser marking system 116 in communication with controller 120. It should be understood that system 200 may include any of the laser marking systems discussed herein in place of marking system 116 shown in FIGS. 12A and 12B.

System 200 includes an overwriting system, shown as inkjet system 202, and a vision system 204. In general, as shown in FIG. 12A, laser system 116 forms dots 38 in the outer surface of cable 10 to form the desired indicia, and in the embodiment shown, dots 38 are indentations formed by the laser interaction with the outer surface of cable 10. Inkjet system 202 is downstream from laser marking system 116, and is positioned to direct ink droplets 206 onto the outer surface of cable 10 to form ink printed indicia 208. In general, ink printed indicia 208 are formed over or aligned with dots 38 so that at least a portion of ink printed indicia 208 resides on the outer surface of cable 10 within the indented portion of dots 38. As will be understood, in the embodiment shown, laser system 116 and inkjet system 202 utilize the same print string to form the same indicia, in the same font and same font size. By using high contrast ink for ink printed indicia 208, visibility of laser formed dots 38 may be enhanced by locating high contrasting ink within the laser formed depressions. Further, the abrasion resistance of ink printed indicia 208 may be enhanced by locating ink indicia within the laser formed depressions. In various embodiments, system 200 may include a surface treatment device to treat the surface of cable 10 to facilitate ink adhesion onto the surface of cable 10. In a particular embodiment, the surface of cable 10 may be polarized or oxidized by plasma treatment to create a surface that wets/bonds with the liquid inkjet droplets from inkjet system 202.

System 200 is also configured to provide for accurate printing of ink printed indicia 208 within laser formed dots 38. In general, system 200 is configured to account and adjust for any of the various sources of misalignment between dots 38 and ink printed indicia 208 that system 200 may experience. As indicated by box 210 in FIG. 12A, vision system 204 is configured to view the relative position of ink printed indicia 208 over dots 38, and a signal representative of the relative position is communicated to controller 120. Controller 120 then uses this positional information to control laser marking system 116 and/or inkjet system 202 to ensure that dots 38 and ink printed indicia 208 are better aligned (e.g., relative distance between dots 38 and ink printed indicia 208 is decreased) during subsequent print passes as indicated by box 212 in FIG. 12B.

As shown in FIG. 12A, the original misalignment during a preceding print pass is shown by Δx and Δy in box 210, and a signal representative of Δx and Δy is communicated to controller 120. In one embodiment, controller 120 utilizes the positional information from vision system 204 to controller laser marking system 116 in order to adjust the position at which dots 38 are formed such that dots 38 are better aligned with ink printed indicia 208 during subsequent printing passes. In such embodiments, because laser marking system 116 is already configured to adjust the position of laser beam 122 for form dots 38 at the different positions to form the desired indicia as discussed above, system 200 is capable of easily adjusting the formation of dots 38 to ensure alignment with ink printed indicia 208 during subsequent print passes. In at least certain embodiments, it is believed that this arrangement provides a faster and more robust alignment system than one in which the position of dots 38 are identified, and the inkjet system 202 is adjusted to align ink printed indicia 208 with dots 38. However, in other embodiments, printing by inkjet system 202 may be adjusted to provide alignment between dots 38 and ink printed indicia 208.

In various embodiments, one or more component of laser marking system 116 may be controlled by controller 120 to adjust the positioning of dots 38 to align with ink printed indicia 208. In one embodiment, the on/off timing of the laser device 130 of laser marking system 116 can be controlled by controller 120 based on the relative position of ink printed indicia 208 and dots 38. In this embodiment, because the position monitoring and the adjustment of ink printed indicia 208 and dots 38 occurs continuously during cable print formation, misalignment typically will only potentially be significant at the first print after startup. Further, because the position monitoring and adjustment of system 200 is continuous, system 200 is able to provide for consistent marking even during changes of line speed such as during ramp-up or ramp-down.

Vision system 204 may be configured to monitor or measure the relative position of ink printed indicia 208 and dots 38 in variety of ways, such as using image processing. This processing may be performed in any suitable way including by a local processing circuit or device that is part of vision system 204 and/or by controller 120. In various embodiments, the relative position of ink printed indicia 208 and dots 38 may be monitored by detecting the top and bottom and left and right boundaries of printed indicia 208 and of dots 38. In other embodiments, the relative position of ink printed indicia 208 and dots 38 may be monitored by detecting relative positions between the edges of one or more particular character (e.g., reference characters) with the indicia print string. Regardless of the measurement technique used, the relative position may be quantified and used to adjust the operation of laser marking system 116 as discussed above. In various embodiments, system 200 may include any suitable detection device in place of, or in addition to, vision system 204 including position sensitive detectors, linescan cameras, etc. Further, system 200 may include any suitable printing device in place of inkjet system 202 including rotating contact printers.

In various embodiments, a method for marking a moving surface of a fiber optic cable is provided. In general, the method relates to high-speed laser marking of a moving surface of an optical cable component. In one embodiment, the method includes the step of providing a laser generating device configured to generate laser light, and includes the step of moving a surface of a fiber optic cable component past the laser generating device at a speed of at least 50 m per minute. The method includes directing the laser light at a plurality of discrete locations on the moving surface, and forming a series of marks on the moving surface through an interaction between the laser light and the surface. In various embodiments, the method may utilize any of the components discussed above, including laser marking devices 116, 170 and 180 and high speed laser marking system 200.

The optical fibers discussed herein may be flexible, transparent optical fibers made of glass or plastic. The fibers may function as a waveguide to transmit light between the two ends of the optical fiber. Optical fibers may include a transparent core surrounded by a transparent cladding material with a lower index of refraction. Light may be kept in the core by total internal reflection. Glass optical fibers may comprise silica, but some other materials such as fluorozirconate, fluoroaluminate, and chalcogenide glasses, as well as crystalline materials, such as sapphire, may be used. The light may be guided down the core of the optical fibers by an optical cladding with a lower refractive index that traps light in the core through total internal reflection. The cladding may be coated by a buffer and/or another coating(s) that protects it from moisture and/or physical damage. These coatings may be UV-cured urethane acrylate composite materials applied to the outside of the optical fiber during the drawing process. The coatings may protect the strands of glass fiber.

In general, it should be understood that the various control components discussed herein, including controller 120 may be any suitable control circuit, processor or computing device, including a general purpose processor, an application specific processor (ASIC), a circuit containing one or more processing components, a group of distributed processing components, a group of distributed computers configured for processing, etc., configured to provide the functionality of the laser marking devices discussed herein. In various embodiments, controller 120 may include or be communicably coupled to an hardware (memory, communications hardware, etc.) or computer code or software components (e.g., object code, program code, compiled code, script code, executable code, instructions, programmed instructions, non-transitory programmed instructions, or any combination thereof) as needed to provide the controller functionality discussed herein.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred.

It will be apparent to those skilled in the art that various modifications and variations can be made without departing from the spirit or scope of the disclosed embodiments. Since modifications, combinations, sub-combinations and variations of the disclosed embodiments incorporating the spirit and substance of the embodiments may occur to persons skilled in the art, the disclosed embodiments should be construed to include everything within the scope of the appended claims and their equivalents. As will be understood by those of ordinary skill in the art, features and attributes associated with embodiments shown in one of the Figures or described in the text relating to one of the embodiments may well be applied to other embodiments shown in another of the Figures and/or described elsewhere in the text.

What is claimed is:

1. A system for marking a moving surface of a fiber optic cable, comprising:
   a supply of the fiber optic cable;
   a laser generating device configured to generate a laser beam that forms markings by interacting with the material of the moving surface of the fiber optic cable, wherein the markings comprise indentations formed in the moving surface;
   a movement device moving the fiber optic cable through the system at a speed of at least 50 m per minute;
   a laser directing device located in the path of the laser beam and configured to change the path of the laser beam to direct the laser beam to a plurality of discrete locations on the moving surface to form a series of marks on the moving surface; and
   a printing system configured to deposit ink indicia into the indentations.

2. The system of claim 1, wherein the laser directing device is configured change the path of the laser beam at least 2000 times per second.

3. The system of claim 1, further comprising an axle and a motor coupled to the axle, wherein the laser directing device comprises a mirror including a plurality of reflective facets, each facet at an angle relative to each other, wherein the mirror is coupled to the axle and the motor rotates the mirror about the axle such that the reflective facets rotate around the axle defining a path that circumscribes the axle.

4. The system of claim 3, wherein the mirror is a polygonal mirror having a first major surface, a second major surface opposite the first major surface, and a peripheral edge surface located between the first major surface and the second major surface, wherein the plurality of reflective facets are located on the peripheral edge surface, and the axle defines a rotational axis that extends through at least one of the first major surface and the second major surface.

5. The system of claim 3, wherein the motor and the axle rotate the mirror continuously in a single direction during operation of the laser generating device to form the markings, wherein the motor controls the rotation of the mirror at a rotational speed of greater than or equal to 2000 rpm.

6. The system of claim 1, further comprising a controller and a laser beam position sensor configured to detect the position of the laser beam, the controller configured to receive a signal from the laser beam position sensor indicative of laser beam location and to send a control signal to at least one of the laser generating device and the laser directing device based on the signal from the laser beam position sensor.

7. The system of claim 6, wherein power to the laser generating device is modulated by the controller to generate laser beam pulses that form discrete markings that together form an indicia on the moving surface, wherein the controller controls the timing of the modulation based on the signal from the laser beam position sensor.

8. The system of claim 1, further comprising a surface position sensor configured to detect the position of a tracking indicia located on the moving surface, the tracking indicia providing an indication of the location on the moving surface where the laser beam is to be directed to form the markings, wherein a controller is configured to receive a signal indicative of the position of the tracking indicia from the surface position sensor and to send a control signal to at least one of the laser generating device and the laser directing device based on the signal from the surface position sensor.

9. The system of claim 1, further comprising a controller, wherein the laser directing device comprises an optical deflector positioned in the path of the laser, the optical deflector is configured to receive a control signal from the controller and to change direction of the laser in response to the control signal.

10. The system of claim 1, wherein the moving surface is an outer surface of at least one of an outer cable jacket, a buffer tube, a tight buffered optical fiber, an optical fiber micro-module, an optical fiber subunit and a fiber optic ribbon.

11. The system of claim 1, further comprising a controller and a vision system configured to detect the position of the ink indicia relative to the indentations, wherein the controller is configured to receive a signal from the vision system indicative of the position of the ink indicia relative to the indentations and to send a control signal to at least one of the laser generating device and the laser directing device based on the signal from the vision system to decrease the distance between the formed indentations and the ink indicia.

12. The system of claim 11, wherein the printing system is an inkjet printing system and the ink indicia are formed from inkjet deposited ink droplets.

13. A method for marking a moving surface of a fiber optic cable, comprising:
    providing a laser generating device configured to generate laser light;
    moving a surface of a fiber optic cable component past the laser generating device at a speed of at least 50 m per minute;
    directing the laser light at a plurality of discrete locations on the moving surface;
    forming a series of marks on the moving surface through an interaction between the laser light and the surface; and
    applying ink onto at least some of the series of marks on the moving surface.

14. The method of claim 13, wherein the laser light changes directions at least 2000 times per second.

15. The method of claim 13, wherein the directing step is performed using a laser directing device that interacts with the laser light to change direction of the laser light.

16. The method of claim 15, wherein the laser directing device comprises an axle, a motor coupled to the axle and a mirror including a plurality of reflective facets, wherein the mirror is coupled to the axle and the motor rotates the mirror about the axle such that the reflective facets rotate around the axle defining a path that circumscribes the axle.

17. The method of claim 16, wherein the plurality of reflective facets are located on a peripheral edge surface the mirror, wherein the axle is located inside of the peripheral edge surface of the mirror and the reflective facets circumscribe the axle.

18. The method of claim 17, wherein the motor rotates the mirror continuously in a single direction during the forming step, wherein the motor controls the rotation of the mirror at a rotational speed of greater than or equal to 2000 rpm.

19. The method of claim 15, wherein the laser directing device comprises an optical deflector positioned in the path of the laser light, the optical deflector is configured to receive a control signal from a controller and to change direction of the laser light in response to the control signal.

20. The method of claim 13, wherein the moving surface is an outer surface of at least one of an outer cable jacket, a buffer tube, a tight buffered optical fiber, an optical fiber micro-module, an optical fiber subunit and a fiber optic ribbon.

* * * * *